United States Patent [19]

Danjo et al.

[11] Patent Number: 5,456,795
[45] Date of Patent: Oct. 10, 1995

[54] METHOD AND APPARATUS FOR REGENERATING ETCHING LIQUID

[75] Inventors: Keishi Danjo, Kamakura; Takashi Enomoto, Sagamihara; Tatsuo Murata, Isehara; Masayuki Shimamune, Tokyo, all of Japan

[73] Assignee: Canon Kabushiki Kaisha, Tokyo, Japan

[21] Appl. No.: 246,502

[22] Filed: May 20, 1994

[30] Foreign Application Priority Data

May 20, 1993 [JP] Japan ................................. 5-139855
May 28, 1993 [JP] Japan ................................. 5-149712

[51] Int. Cl.⁶ .......................... B44C 1/22; C23F 1/02
[52] U.S. Cl. .................. 216/93; 216/101; 216/108; 252/79.2
[58] Field of Search .................... 156/626, 627, 156/642, 656, 667, 345; 252/79.2, 79.3, 79.4

[56] References Cited

U.S. PATENT DOCUMENTS

| | | | |
|---|---|---|---|
| 3,526,560 | 9/1970 | Thomas | 156/642 X |
| 3,933,544 | 1/1976 | Haas | 156/642 X |
| 4,472,236 | 9/1984 | Tanaka et al. | 156/642 |

*Primary Examiner*—William Powell
*Attorney, Agent, or Firm*—Fitzpatrick, Cella, Harper & Scinto

[57] ABSTRACT

An aqueous mixture etchant containing hydroiodic acid and ferric chloride is suitable for etching ITO to form a minute electrode pattern as used in a liquid crystal display device. When the etchant has caused a decrease in etching performance due to a compositional change, it can be effectively regenerated by replenishing appropriate amounts of hydrochloric acid and pure water, or an appropriate amount of a dilute hydrochloric acid at a constant concentration, while minimizing the use of hydroiodic acid and ferric chloride which are rather expensive compared with hydrochloric acid and pure water.

8 Claims, 3 Drawing Sheets

METHOD AND APPARATUS FOR REGENERATING ETCHING LIQUID

FIELD OF THE INVENTION AND RELATED ART

The present invention relates to a system (method and apparatus) for regenerating an etchant (etching liquid) suitable for producing an electrode pattern on a substrate, e.g., an electrode plate for a liquid crystal device.

Hitherto, in order to pattern an ITO (indium tin oxide) film on a substrate for a liquid crystal display device (panel) to form a minute electrode pattern of ITO thereon, it has been practiced to use an etching liquid (etchant), such as a hydrochloric acid—ferric chloride mixture liquid, and a hydrochloric acid—nitric acid mixture liquid. In an etching process using such a hydrochloric acid-based etchant, the composition of the etchant per se changes with the progress of the etching, so that it is difficult to control the etching rate so as to accurately control the mixture electrode pattern width.

It has been already known to control the etchant composition at constant so as to always effect good patterning in resistance to such an etchant composition change. In the known method, water, hydrochloric acid and a reducing agent are replenished so as to keep the oxidation-reduction potential and specific gravity of the etchant at constant.

On the other hand, the use of such a known hydrochloric acid-based etchant for ITO, inclusive of a hydrochloric acid—ferric chloride mixture liquid and a hydrochloric acid—nitric acid mixture liquid, is further accompanied with a difficulty that undercut of the ITO pattern is liable to be caused due to penetration of the etchant to the boundary between the ITO and the photoresist film, thus being unsuitable for formation of a fine electrode pattern as required in a high-resolution liquid crystal display device. Further, in case where an ITO pattern is formed on an organic film such as a color filter as in the production of a color liquid crystal display device, there is also encountered a difficulty that the ITO film is liable to be peeled off the organic film due to a weak adhesion at the boundary therebetween in addition to the disorder at the pattern edge caused for a similar reason as described above, so that the patterning of ITO becomes further difficult.

In contrast thereto, in case of using an etchant comprising a mixture of hydroiodic acid and ferric chloride, fine patterning of ITO is suitably performed because of very little undercut, and patterning of ITO on an organic film, such as a color filter, is also possible, so that the use of such a hydroiodic acid—ferric chloride mixture etchant has been also used in place of a conventional hydrochloric acid-based etchant.

However, the use of such a hydroiodic acid—ferric chloride mixture etchant is found to still involve a difficulty that, along with continual use, the etchant causes a compositional change and deterioration in etching performance leading to frequent occurrence of short circuit between adjacent electrodes. Another difficulty is that the hydroiodic acid is very expensive.

SUMMARY OF THE INVENTION

An object of the present invention is to provide a system (method and apparatus) for regenerating a hydroiodic acid—ferric chloride mixture etchant with minimum consumption of expensive hydroiodic acid.

According to our study, it has been found that the above-mentioned compositional change and deterioration in etching performance of the etchant is caused principally due to the following equilibrium in the etchant system:

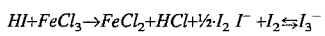

$$HI + FeCl_3 \rightarrow FeCl_2 + HCl + \tfrac{1}{2} I_2 \quad I^- + I_2 \rightleftharpoons I_3^-$$

Because of the equilibrium, mist containing chlorine ion or hydrochloric acid is lost and the function of hydroiodic acid, which is very expensive, is lost accompanying therewith, thus causing a compositional change and deterioration in etching performance of the etchant leading to the difficulties.

According to the present invention accomplished based on the above knowledge, there is provided a method of regenerating an etchant for forming an electrode pattern through etching on a substrate, said etchant comprising an aqueous mixture liquid containing at least hydroiodic acid and ferric chloride, the method comprising:

replenishing hydrochloric acid and water in amounts appropriate to keep a constant chlorine ion concentration and a constant specific gravity of the etchant.

According to another aspect of the present invention, there is provided an apparatus for regenerating an etchant for forming an electrode pattern through etching on a substrate, comprising:

a first means for continually detecting the chlorine ion concentration and the specific gravity of the etchant, a second means for deriving amounts of hydrochloric acid and water sufficient to keep the chlorine ion concentration and specific gravity of the etchant at constant from the detected chlorine ion concentration and specific gravity of the etchant, and a third means for replenishing the derived amounts of hydrochloric acid and water to the etchant.

According to a further aspect of the present invention, there is provided a method of regenerating an etchant for forming an electrode pattern through etching on a substrate, said etchant comprising an aqueous mixture liquid containing at least hydroiodic acid and ferric chloride, the method comprising:

replenishing dilute hydrochloric acid at a constant concentration to the etchant.

According to a still further aspect of the present invention, there is provided an apparatus for regenerating an etchant for forming an electrode pattern through etching on a substrate, comprising:

a first means for continually detecting the specific gravity of the etchant, and a second means for deriving and replenishing an amount of dilute hydrochloric acid sufficient to keep the specific gravity of the etchant at constant.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
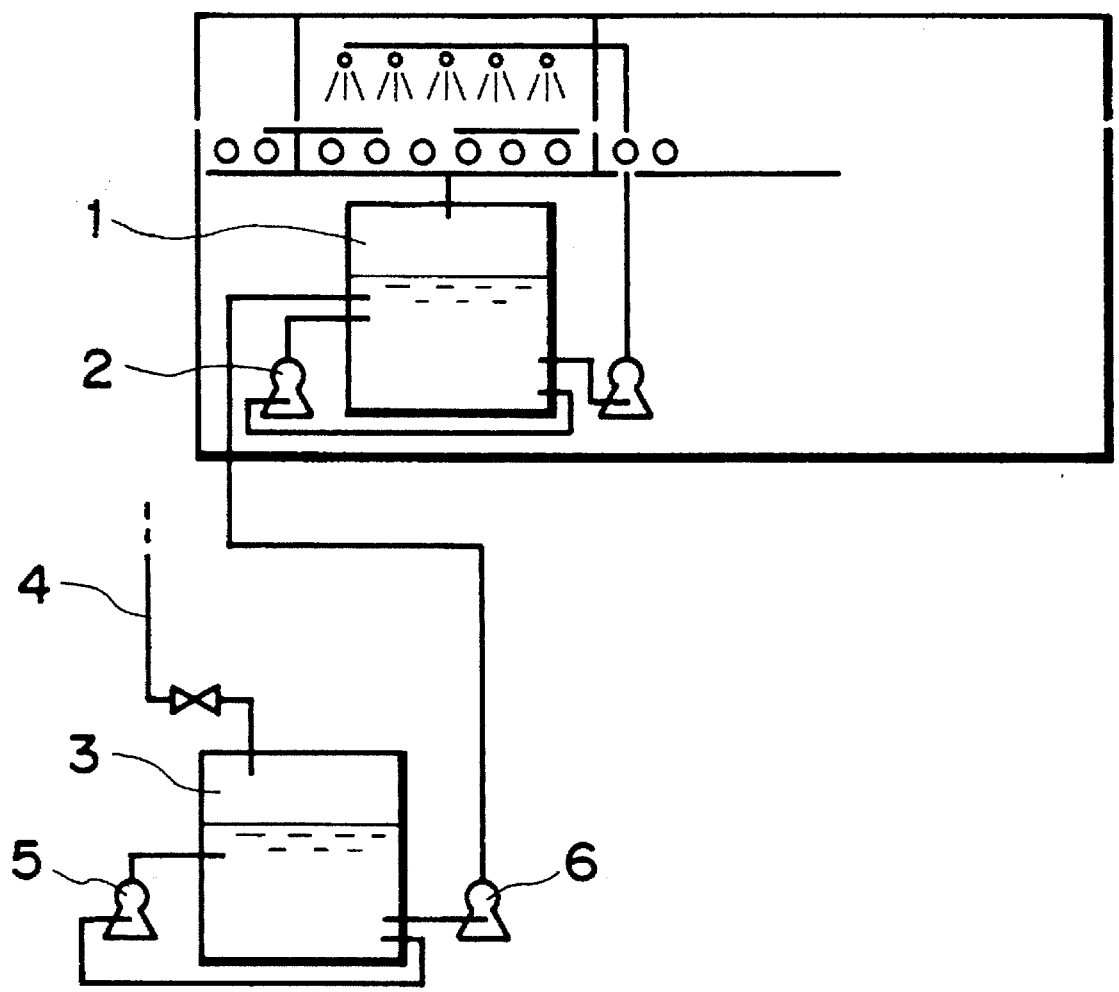
FIGS. 1–3 are respectively a schematic illustration of a system (method and apparatus) for regenerating an etchant according to an embodiment of the present invention.

First of all, a method of deriving amounts of water and hydrochloric acid appropriate to be replenished in a first embodiment of the present invention will be described.

Now, it is assumed that an etchant having a composition differing from the original composition thereof is present in a quantity of A (liter) and at a specific gravity of $d_A$ and a chlorine ion concentration of $C_A$ (g/liter), and the etchant is regenerated to have a specific gravity $d_B$ and a chlorine ion concentration $C_B$ (g/liter) by replenishing an amount x (liter) of hydrochloric acid, e.g., a commercially available one having a concentration of 35% and a specific gravity of 1.75, and an amount y (liter) of water. Then, the following relationship exists:

$$C_B \text{ (g/l)} = [A \text{ (l)} \times C_A \text{ (g/l)} + x \text{ (l)} \times 1175 \text{ (g/l)} \times 0.35]/[A \text{ (l)} + x \text{ (l)} + y \text{ (l)}] \quad (1)$$

$$1000 \times d_B(A \text{ (l)} + x \text{ (l)} + y \text{ (l)}) = 1000 \times d_B \times A \text{ (l)} + 1000 \times 1.175 \times x \text{ (l)} + 1000 \times 1.000 \times y \text{ (l)} \quad (2)$$

From the above relationship, the amounts x of the hydrochloric acid and y of water are calculated as follows:

$$x \text{ (l)} = [A \text{ (l)} \times C_B \text{ (g/l)} (d_A - 1) - A \text{ (l)} \times C_A \text{ (g/l)} (d_B - 1)]/[411.25(d_B - 1) - 0.175 \, C_B \text{ (g/l)}] \quad (3)$$

$$y \text{ (l)} = A \text{ (l)} \{[C_B \text{ (g/l)} (d_A - 1) - C_A \text{ (g/l)} (d_B - 1)]/411.25 (d_B - 1) - 0.175 \, C_B \text{ (g/l)})\} \times [(411.25/C_B \text{ (g/l)}) - 1] + A \text{ (l)} [C_A \text{ (g/l)} - C_B \text{ (g/l)}]/C_B \text{ (g/l)} \quad (4)$$

Accordingly, if the current values of quantity (A), specific gravity ($d_A$) and chlorine ion concentration ($C_A$) are measured, the amounts x and y of hydrochloric acid and water to be replenished for providing prescribed values of specific gravity ($d_B$) and chlorine ion concentration ($C_B$) set to be substantially identical to those of a fresh etchant can be derived. Thus, by replenishing the amounts of hydrochloric acid and water to the etchant, the etchant can be regenerated to have a composition identical to that of the fresh etchant.

Prior to replenishing the hydrochloric acid and water, it is preferred to mix them in advance to provide a dilute acid and replenish the dilute acid to the etchant, so as to avoid precipitation of a solid matter which is possibly caused by direct addition of the hydrochloric acid at a higher concentration and can be detrimental to effective regeneration of the etchant.

In a preferred embodiment of the present invention, a single liquid of dilute hydrochloric acid at a constant concentration instead of hydrochloric acid and water is replenished to keep the specific gravity of the etchant at constant, whereby the time required for deriving the amounts of hydrochloric acid and water in the above-described embodiment can be shortened. The reason why the replenishment of a single liquid of dilute hydrochloric acid is satisfactory in regenerating the etchant is explained below.

With the progress of etching, the ratio between the amounts of hydrochloric acid and water vaporized from the etchant changes with time, so that the ratio of hydrochloric acid and water to be replenished basically changes. However, within a range of specific gravity change being up to 1.1 times the original value, it has been found possible to regard that the ratio of the vaporization of hydrochloric acid and water as constant, so that it is possible to use a single liquid of dilute hydrochloric acid at a constant concentration as a replenishing liquid.

Further, the reduction in chlorine concentration was repetitively measured at different specific gravities of the etchant, whereby the results as shown in Table 1 were obtained.

TABLE 1

Reduction in chlorine concentration (relative to the original chorine concentration) as a repetitive measurement of different S.G. (specific gravities relative to the initial value).

| | S.G. (times) | | | | |
|---|---|---|---|---|---|
| Measurement | 1.05 | 1.10 | 1.15 | 1.20 | 1.25 |
| 1st | 29.5% | 40.0% | 55.0% | 74.5% | 97.0% |
| 2nd | 30.5 | 39.5 | 58.0 | 70.5 | 90.5 |
| 3rd | 31.0 | 40.5 | 60.5 | 68.5 | 86.0 |
| 4th | 31.0 | 41.5 | 52.0 | 79.5 | 92.0 |
| 5th | 31.5 | 42.0 | 51.5 | 67.5 | 82.5 |
| R (Max-Min) | 2.0 | 2.5 | 9.0 | 12.0 | 14.5 |

As shown in Table 1 above, as the hydrochloric acid and water are vaporized to provide a larger specific gravity, the fluctuation in chlorine concentration reduction increases, so that the chlorine concentration fluctuation can be suppressed within a tolerable range if the specific gravity increase is suppressed within the range of up to 1.1 times.

In this embodiment of the present invention, the etchant is regenerated by continually monitoring the specific gravity of the etchant and replenishing dilute hydrochloric acid so as to regulate the specific gravity of the etchant in a prescribed control range. In this instance, the amount of dilute hydrochloric acid replenished at a time should be at most 10 wt. %, of the etching liquid, preferably in the range up to 5 wt. %. In excess of 10 wt. %, it takes a long time until the ratios among various ions ($Cl^-$, $Fe^{2+}$, $Fe^{3+}$, $I^-$, $I_3^-$) are stabilized Hereinbelow, the present invention will be described in more detail based on Examples.

EXAMPLE 1

FIG. 1 illustrates an embodiment of the system for regenerating the etchant according to the present invention, particularly a regeneration apparatus including a hydrochloric acid-water mixing vessel 3 accompanied with a ultrapure water inlet pipe 4, a regeneration liquid-circulating pump 5 and a regeneration liquid feed pump 6 added to an ITO etching line including an ITO etchant vessel 1 equipped with an etchant-circulating pump 2.

The etchant vessel 1 contains a mixture etchant of hydroiodic acid (58 wt. %) and ferric chloride (35 wt. %) (=7:3 by vol.), which is stirred by the operation of the etchant circulation pump 2. The etchant in its fresh state principally contains total iodine ion of 600–700 g/l, total iron ion of 40–60 g/l, and chlorine ion of 80–100 g/l and has a specific gravity of 1.5–1.6.

During the etching, because of the heating and spraying of the etchant, mist containing chlorine is generated and discharged out of the system together with the exhaust air or sent to other recovery facilities.

As a result, the etchant composition can change including principal components changes of, e.g., total iodine ion concentrated to 1100–1200 g/l, total iron ion concentrated to 90–110 g/l and, on the contrary, chlorine ion reduced to 0–5 g/l.

In a specific example, accompanying the etchant composition change, the etching performance inclusive of side etching quantity varies. Accordingly, y (liter) of ultrapure water calculated by the above-mentioned equation (4) and x (liter) of hydrochloric acid preliminarily mixed in the mixing vessel 3 with stirring by the circulation pump 4 were supplied through the regeneration liquid feed pump 6 to the etchant vessel 1 for mixing by circulation by the circulation pump 2.

As a result, the etchant having caused the above-mentioned composition change was regenerated into an etchant having the concentrations of total iodine ion, total iron ion and chlorine ion all identical to those in the initial state of the etchant. As a result, the regenerated etchant showed etching performances with remarkably reduced occurrence of short circuit between electrodes.

EXAMPLE 2

Figure 2:
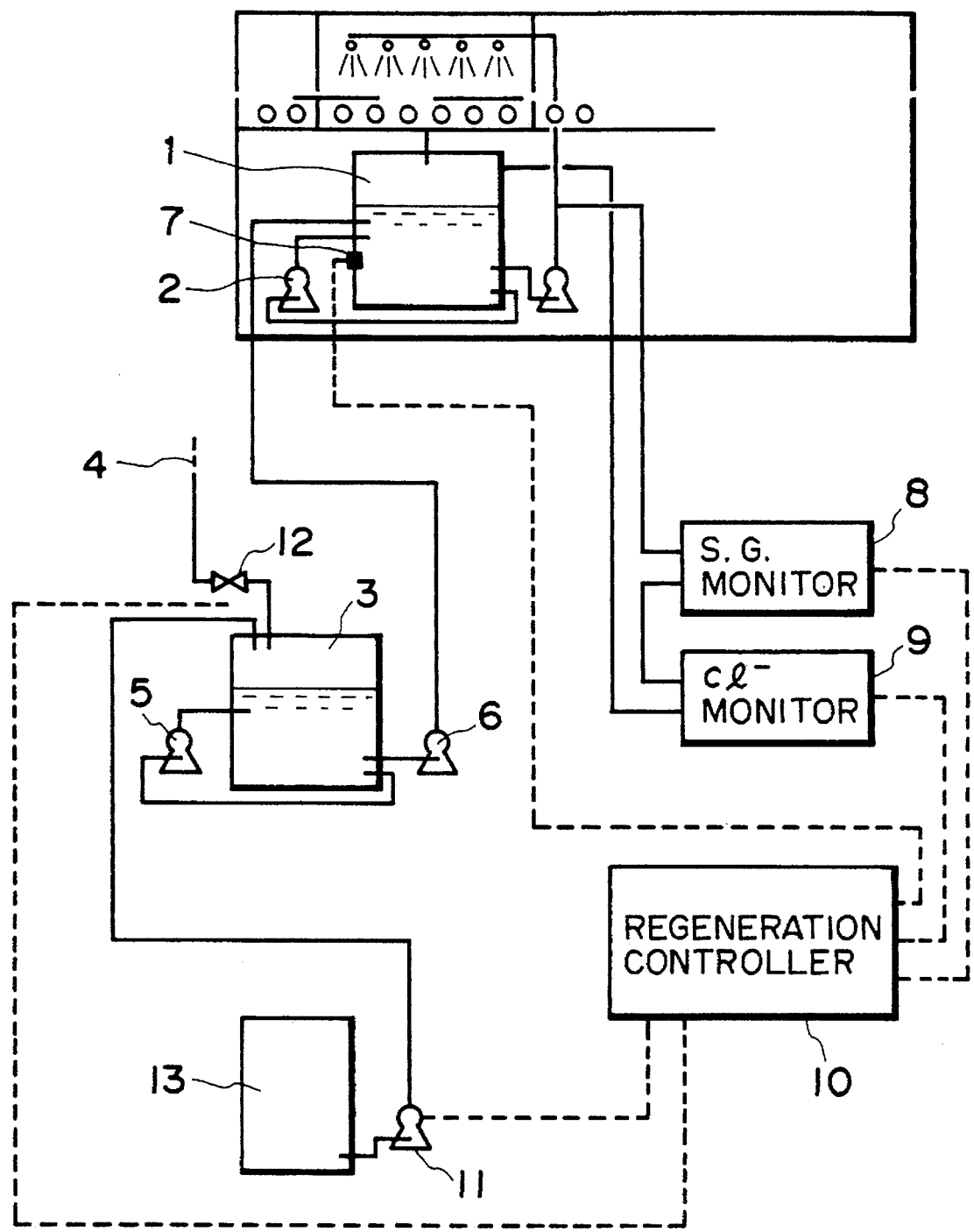

FIG. 2 illustrates another embodiment of the etchant regeneration apparatus according to the present invention. The apparatus is particularly characterized by inclusion of a regeneration controller for controlling the replenished amounts of hydrochloric acid and water according to the equations (3) and (4) described above.

Referring to FIG. 2, an ITO etchant vessel 1 contains an etchant identical to that used in Example 1, which is stirred by circulation with an etchant circulation pump 2. The etchant vessel 1 is equipped with a liquid lower limit sensor 7, a specific gravity monitor 8, a chlorine ion concentration monitor 9 of an ion electrode type. When the sensor 7 detects the lower limit of the etchant caused by the decrease in etchant quantity with the progress of the etching treatment, the specific gravity of the etchant at that time is measured by the specific gravity monitor 8 and the chlorine ion concentration of the etchant is measured by the ion electrode-type chlorine ion concentration monitor 9. The liquid lower limit is set to, e.g., a half of the initial quantity.

The lower limit quantity, specific gravity and chlorine ion concentration measured in the above-described manner are sent to a regeneration controller 10, from which instructions of supplying x (liter) of hydrochloric acid derived from the equation (3) and y (1) of ultrapure water derived from the equation (4) to a hydrochloric acid pump 11 connected to a hydrochloric acid tank 13 and an ultrapure water electromagnetic valve 12 inserted in the ultrapure water supply pipe 4, respectively.

The hydrochloric acid tank 14 contains hydrochloric acid at a concentration of 35%. The hydrochloric acid may be supplied through the hydrochloric acid pump 11 to a hydrochloric acid— water mixing vessel 3. In the mixing vessel 3 replenished with x (liter) of hydrochloric acid and y (liter) of water at the instruction of the regeneration controller 10, the replenished liquids are mixed with the etchant therein by the circulating pump 5 until the liquid becomes uniform. The thus formulated regenerating liquid is supplied through a feed pump 6 to the ITO etchant vessel 1 and mixed with the etchant therein by the operation of the circulation pump 2.

In a specific example, by using a regeneration system including a regeneration in controller 10 for controlling the replenishing amounts of hydrochloric acid and water, the degraded etchant could be automatically regenerated to exhibit a stable etching performance. Further, the fresh etchant feed and waste etchant disposal could be remarkably reduced.

EXAMPLE 3

Figure 3:
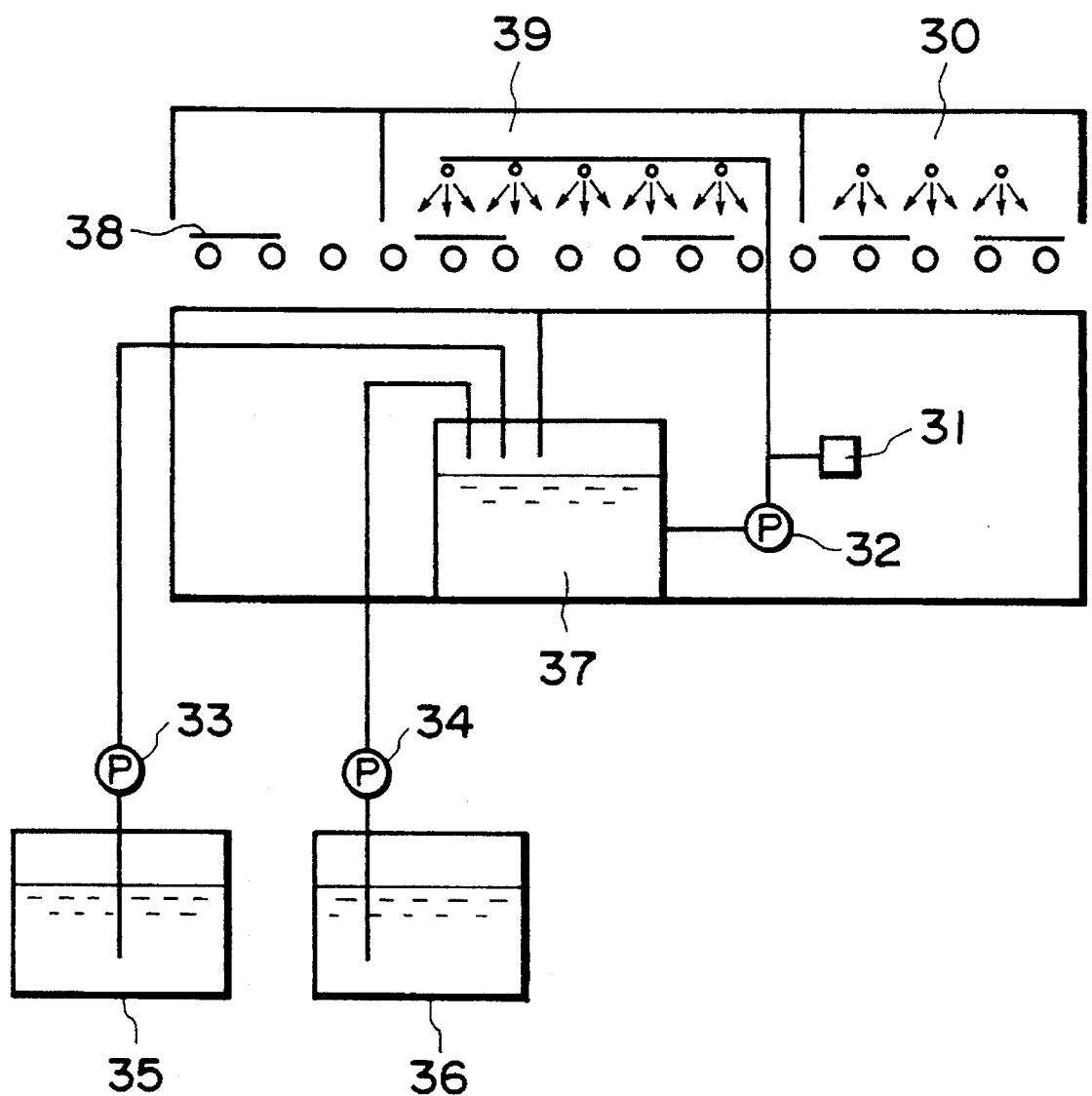

FIG. 3 is an illustration of another embodiment of the etchant regeneration system according to the present invention, including a dilute hydrochloric acid supply vessel in addition to an ITO etching line generally including a fresh etchant supply system.

More specifically, the regeneration system includes an etchant-showering chamber 39 in which ITO-coated glass substrates 38 are introduced and subjected to etching, an etchant vessel 37 from which an etchant is supplied through an etchant circulation pump 32 to the etchant-showering chamber 39, a specific gravity meter 31 for continually monitoring the specific gravity of the etchant supplied from the etchant vessel 37, a dilute hydrochloric acid tank 35 from which dilute hydrochloric acid for regeneration is supplied through a pump 33 to the etchant vessel 7, and a fresh etchant tank 36 from which a fresh etchant is supplied through a pump 34 to the etchant vessel 37.

More specifically, glass substrates 38 for liquid crystal display device are coated with an ITO film, and a photoresist film and subjected to photoexposure and development of the exposed resist. Then, as an etching step for forming a minute electrode pattern, the ITO-coated glass substrates 38 thus treated are introduced into the etchant-showering chamber 39, wherein the etchant heated at, e.g., 45° C. is showered onto the substrates 38 to etch the exposed parts of the ITO film.

In this embodiment, the specific gravity of the etchant in the etchant vessel 37 is continually measured by the specific gravity meter 31 while being supplied to the showering chamber 39, and an amount of dilute hydrochloric acid necessary and sufficient to return the measured specific gravity value to the initial value is replenished from the dilute hydrochloric acid tank 35 through the pump 33 to the etchant chamber 37.

In a specific example, the etchant vessel 37 contained a mixture etchant of hydroiodic acid (58 wt. and ferric chloride (35 wt. %) (=7:3 by vol.), which was supplied to the showering chamber 39 by the operation of the etchant circulation pump 32. The etchant in its fresh state principally contained total iodine ion of 600–700 g/l, total iron ion of ca. 55 g/l, and chlorine ion of ca. 90 g/l and had a specific gravity of ca. 1.59.

During the etching, because of the heating and spraying of the etchant, mist containing chlorine is generated and discharged out of the system together with the exhaust air or sent to other recovery facilities. As a result, the etchant composition can change including principal components changes of, e.g., total iodine ion concentrated up to ca. 1200 g/l, total iron ion concentrated up to ca. 120 g/l and, on the contrary, chlorine ion reduced to ca. 0 g/l. Accompanying the etchant composition change, the ITO etching performance thereof can be deteriorated, thus resulting in difficulty, such as frequent occurrence of short circuit between electrodes in the product, so that it becomes necessary to regenerate the etchant.

In this example, totally 80 liter of the etchant in the etchant chamber 37 was regenerated when the specific gravity thereof was increased to 1.67 (deviation of 5% from the original value of 1.59) by adding 3 liter of dilute hydrochloric acid (2:1 mixture of conc. hydrochloric acid and pure water) prepared in advance to the etchant in the chamber 37, followed by mixing.

As a result, the etchant having caused the above-mentioned composition change was regenerated into an etchant having the concentrations of total iodine ion, total iron ion and chlorine ion all identical to those in the initial state of the etchant.

The regeneration of the etchant could be repeatedly performed in the above-described manner.

The regenerated etchant showed etching performances with remarkably reduced occurrence of short circuit between electrodes compared with those before the regeneration.

Finally, the etchant reduced with the continued use was replenished with a fresh etchant from the fresh etchant tank 6 into a total of 80 liter.

EXAMPLE 4

In Example 3, an etchant having a chlorine concentration of 90 g/l in its fresh state was regenerated. In this example, an etchant having a chlorine concentration of 50 g/l and a specific gravity of 1.75 in its fresh state could be regenerated so as to retain the chlorine concentration of 50 g/l.

The specific gravity of the etchant on continuation of the etching was monitored in the same manner as in Example 3 and, when the specific gravity was increased up to 1.87 (deviation of 7% from the original value), the etchant was regenerated by adding 4 liter of dilute acid prepared in advance (by mixing in conc. hydrochloric acid and pure water in a ratio of 2:1), followed by mixing in the etchant chamber 37.

As a result, the etchant having caused the above-mentioned composition change was regenerated into an etchant having the concentrations of total iodine ion, total iron ion and chlorine ion all identical to those in the initial state of the etchant.

The regenerated etchant showed etching performances with little occurrence of short circuit between electrodes similarly as the fresh etchant.

Finally, the etchant reduced with the continued used was replenished with a fresh etchant from the fresh etchant tank 6 into a total of 80 liter.

As described above, according to the present invention, an ITO etchant mixture comprising hydroiodic acid and ferric chloride having caused a decrease in etching performance due to a compositional change can be regenerated by replenishing appropriate amounts of hydrochloric acid and pure water, or an appropriate amount of a dilute hydrochloric acid at a constant concentration, while minimizing the use of hydroiodic acid and ferric chloride which are rather expensive compared with hydrochloric acid and pure water, thus minimizing the etchant regeneration cost.

What is claimed is:

1. A method of regenerating an etchant for forming an electrode pattern through etching on a substrate, said etchant comprising an aqueous mixture liquid containing at least hydroiodic acid and ferric chloride, the method comprising:

replenishing hydrochloric acid and water in amounts appropriate to keep a constant chlorine ion concentration and a constant specific gravity of the etchant.

2. A method according to claim 1, wherein the amounts of hydrochloric acid and water replenished are calculated based on the chlorine ion concentration and specific gravity of the etchant.

3. A method according to claim 1 or 2, wherein the amounts of hydrochloric acid and water are replenished after being mixed with each other.

4. An apparatus for regenerating an etchant for forming an electrode pattern through etching on a substrate, comprising:

a first means for continually detecting the chlorine ion concentration and the specific gravity of the etchant, a second means for deriving amounts of hydrochloric acid and water sufficient to keep the chlorine ion concentration and specific gravity of the etchant at constant from the detected chlorine ion concentration and specific gravity of the etchant, and a third means for replenishing the derived amounts of hydrochloric acid and water to the etchant.

5. A method of regenerating an etchant for forming an electrode pattern through etching on a substrate, said etchant comprising an aqueous mixture liquid containing at least hydroiodic acid and ferric chloride, the method comprising:

replenishing dilute hydrochloric acid at a constant concentration to the etchant.

6. A method according to claim 5, wherein the specific gravity of the etchant is continually detected, and the dilute hydrochloric acid at a constant concentration is replenished in an amount sufficient to keep the specific gravity of the etchant at constant.

7. A method according to claim 5 or 6, wherein the dilute hydrochloric acid is replenished for regeneration in an amount of at most 10 wt. % of the etchant when the specific gravity of the etchant is deviated by at most 10% from the initial value thereof.

8. An apparatus for regenerating an etchant for forming an electrode pattern through etching on a substrate, comprising:

a first means for continually detecting the specific gravity of the etchant, and a second means for deriving and replenishing an amount of dilute hydrochloric acid sufficient to keep the specific gravity of the etchant at constant.

* * * * *

UNITED STATES PATENT AND TRADEMARK OFFICE
CERTIFICATE OF CORRECTION

PATENT NO. : 5,456,795
DATED : October 10, 1995
INVENTOR(S) : KEISHI DANJO, ET AL.

It is certified that error appears in the above-identified patent and that said Letters Patent is hereby corrected as shown below:

COLUMN 4

Line 36, "stabilized" should read --stabilized.--.
Line 45, "a" should read --an--.

COLUMN 5

Line 61, "In" should be deleted.

COLUMN 6

Line 16, "vessel 7," should read --vessel 37,--.
Line 36, "chamber 37." should read --vessel 37.--.
Line 38, "(58 wt." should read --(58 wt.%)--.
Line 59, "chamber 37" should read --vessel 37--.
Line 61, "3 liter" should read --3 liters--.
Line 64, "chamber 37," should read --vessel 37,--.

COLUMN 7

Line 11, "6" should read --36-- and "80 liter." should read --80 liters.--.
Line 24, "4 liter" should read --4 liters--.
Line 27, "chamber 37." should read --vessel 37.--.

UNITED STATES PATENT AND TRADEMARK OFFICE
CERTIFICATE OF CORRECTION

PATENT NO. : 5,456,795
DATED : October 10, 1995
INVENTOR(S) : KEISHI DANJO, ET AL.

It is certified that error appears in the above-identified patent and that said Letters Patent is hereby corrected as shown below:

COLUMN 7

Line 38, "6" should read --36-- and "80 liter." should read --80 liters.--.

Signed and Sealed this

Fourteenth Day of May, 1996

Attest:

BRUCE LEHMAN

Attesting Officer    Commissioner of Patents and Trademarks